April 30, 1968  W. H. COLLINS  3,380,603
HOIST
Filed Oct. 23, 1965  2 Sheets-Sheet 1
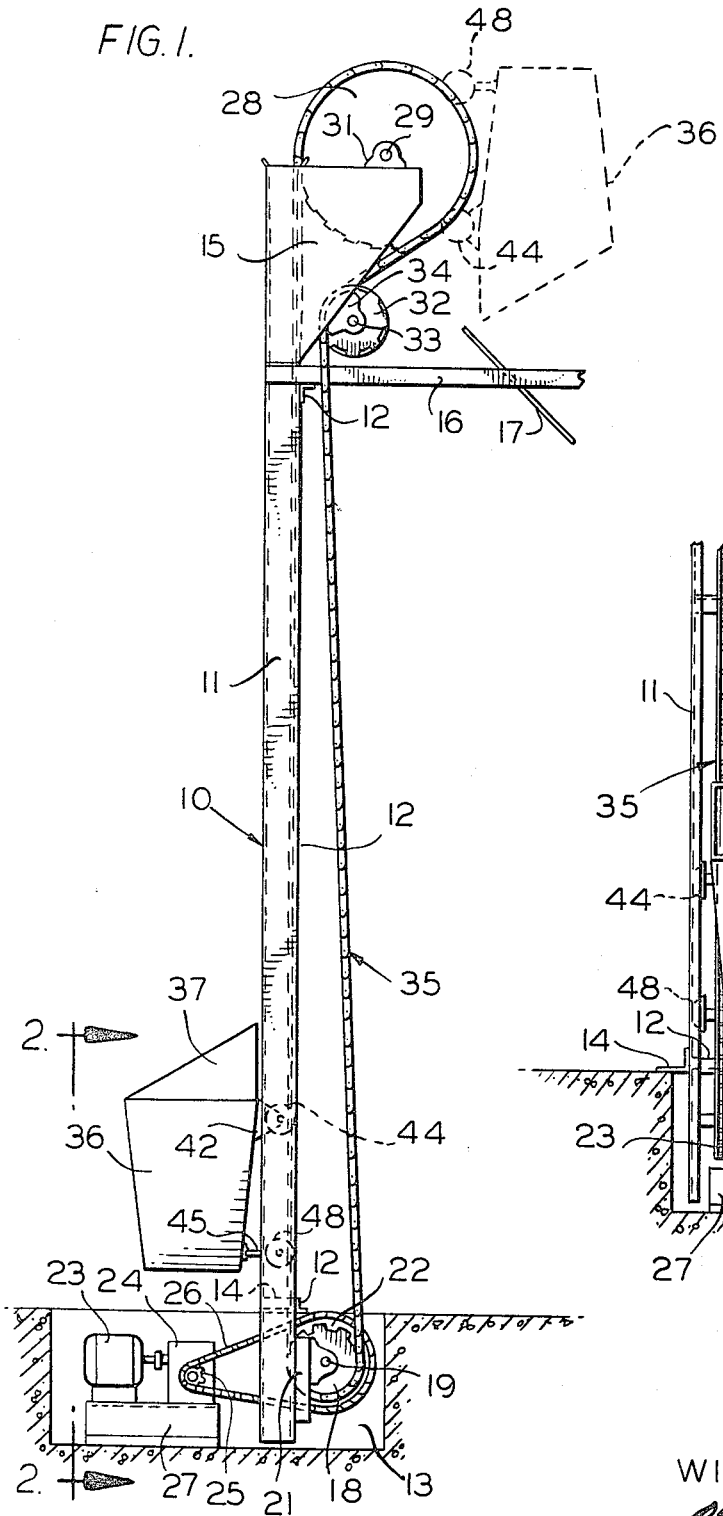
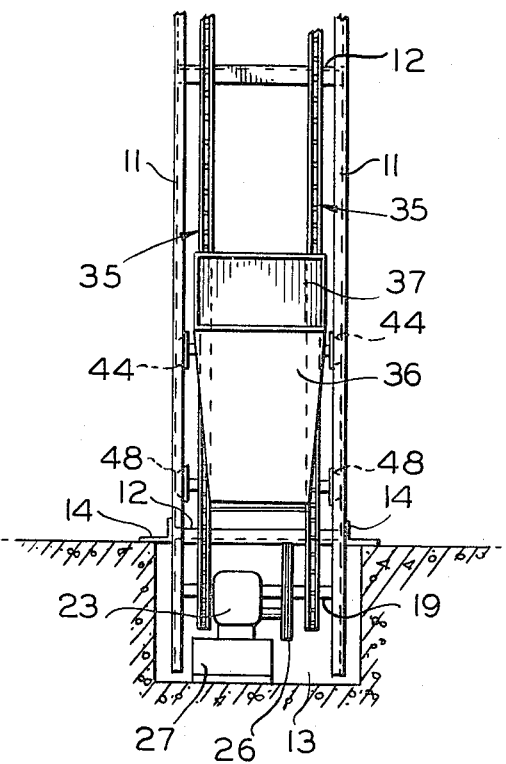
INVENTOR
WILLYS H. COLLINS
William Turner
ATT'Y

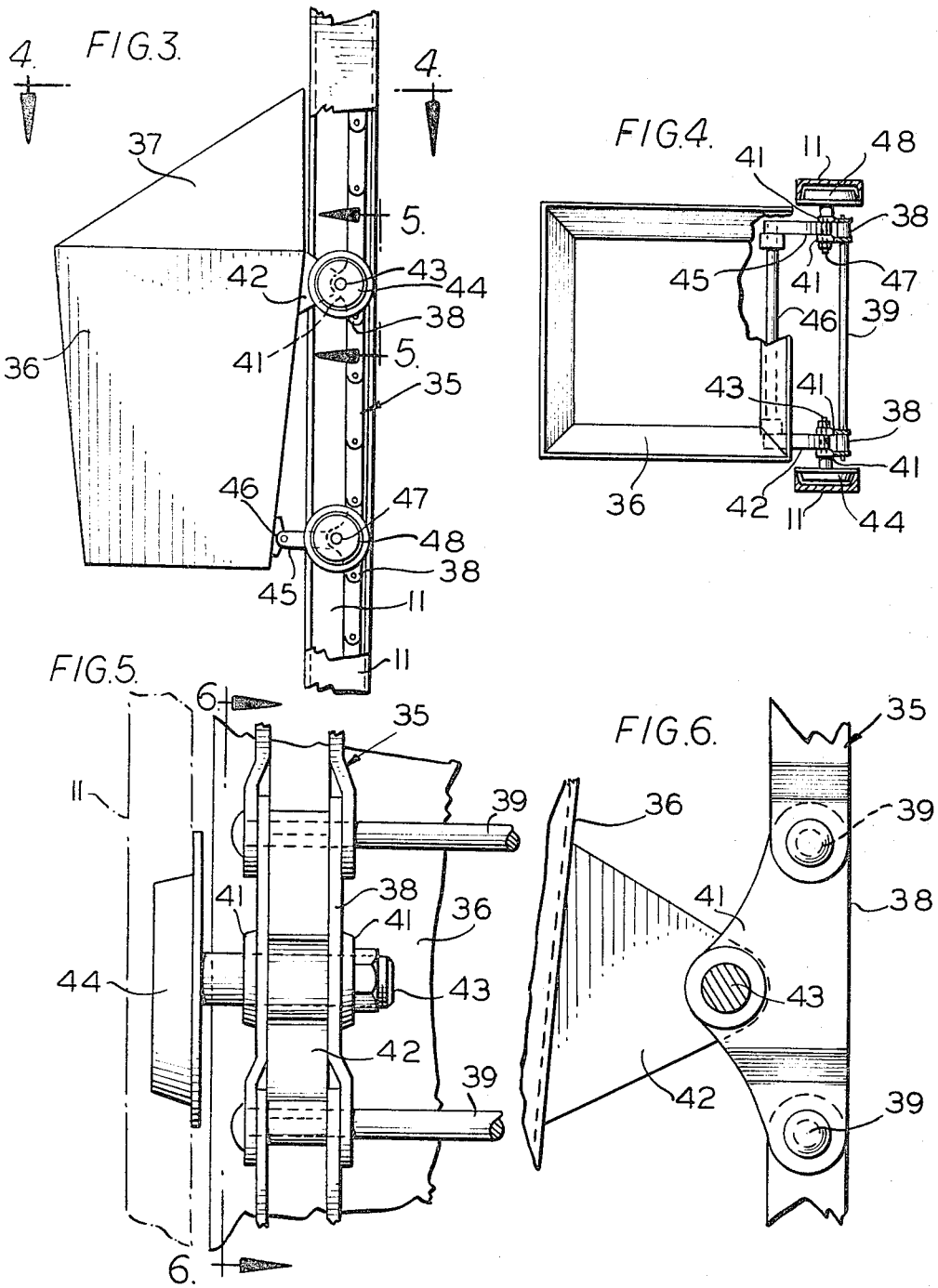

United States Patent Office 3,380,603
Patented Apr. 30, 1968

3,380,603
HOIST
Willys H. Collins, Houston, Tex., assignor to Link Belt Company, a corporation of Illinois
Filed Oct. 23, 1965, Ser. No. 503,235
8 Claims. (Cl. 214—103)

ABSTRACT OF THE DISCLOSURE

A skip hoist employing a pair of laterally spaced parallel chains guided for movement along a defined path and having a bucket supportingly connected therebetween to laterally opposed points on spaced pitches of each of the chains in a manner permitting limited longitudinal motion of the bucket relative to the chains to compensate for the shortened distance between the connecting points during their movement through arcuate portions of the defined path.

---

This invention relates generally to hoisting devices and more particularly to a double chain skip hoist including a new and improved bucket carrier and guide construction.

Single bucket skip hoists are widely used in construction work and in industrial applications where material is to be elevated to a discharge point at which the skip bucket is inverted to dump the material therefrom. When sticky material such as concrete is being handled, it is important that the inversion of the bucket be as complete as possible to facilitate the discharge of the material. It is also important that the inversion of the bucket and its return to an upright position be accomplished in a positive manner to avoid spillage of the material and to provide speed and ease of operation for the skip hoist.

It is therefore the primary object of the present invention to provide a new and improved positive discharge skip hoist.

Another object of this invention is to provide a skip hoist which will completely invert the skip bucket at the discharge point and return of the bucket to its upright position without requiring any bucket guides or supports at the discharge point apart from the bucket propelling members.

A further object of the invention is to provide a chain type skip hoist having bucket guides that can be manufactured using standard structural members without any special machining or forming thereof to guide the bucket to and from its discharge position.

Another object of the invention is to provide a new and improved means for mounting a skip bucket upon spaced chain links in a manner to permit movement of the chain and its associated bucket either through a straight path or onto the chain sprocket.

Other objects and advantages of the invention will be apparent during the course of the following description.

In the accompanying drawings forming a part of this specification and in which like reference characters are employed to designate like parts throughout the same:

FIGURE 1 is a side elevational view of a skip hoist embodying the invention showing the bucket in its loading position and, in broken lines, showing the bucket in its unloading position;

FIGURE 2 is a sectional view taken on line 2—2 of FIG. 1;

FIGURE 3 is an enlarged fragmentary view, partly broken away, of bucket, chain and guides shown in FIG. 1;

FIGURE 4 is a sectional view taken on lines 4—4 of FIG. 3 and partly broken away to show a point of connection between one chain and the bucket;

FIGURE 5 is an enlarged fragmentary sectional view taken on lines 5—5 of FIG. 3; and FIGURE 6 is a fragmentary sectional view taken on lines 6—6 of FIG. 5.

In the drawings, wherein for the purpose of illustration is shown a preferred embodiment of the invention, and first particularly referring to FIGS. 1 and 2, the skip hoist of the present invention generally indicated by the reference numeral 10 includes a frame formed of a pair of vertically mounted channel members 11 having their channels facing each other and in spaced relationship. The members 11 are connected to each other at spaced points along their lengths by angle irons 12 and are supported at their lower end portions on opposite sides of the drive pit 13 by L-shaped fasteners 14, as seen in FIG. 2.

The upper end portion of each member 11 has mounted thereon a support bracket 15 and braces 16 extend from the upper end portion of each member 11 to any appropriate supporting structure, not shown. If desirable, a deflector plate 17 may be mounted between the braces 16 to direct the flow of material discharged from the skip hoist 10 to a selected point of use.

A pair of foot sprockets 18 are mounted on a shaft 19 extending between the lower end portions of the members 11 in the drive pit 13 and the opposite end portions of the shaft are rotatably supported on the members by takeups 21. A drive sprocket 22 is mounted upon the shaft 19 between the foot sprockets 18 to drive the shaft and foot sprockets. The drive sprocket 22 is driven by motor 23 through a speed reducer 24 having a sprocket 25 drivingly connected to the sprocket 22 by a drive chain 26. The motor 23 and speed reducer 24 are mounted in the drive pit 13 on a suitable base 27.

A pair of relatively large diameter head sprockets 28 are mounted on a shaft 29 the opposite end portions of which are rotatably supported by bearings 31 mounted on the support brackets 15. The head sprockets 28 are each radially aligned with a corresponding foot sprocket 18 and both the head and foot sprockets are arranged in tangential relationship with the plane defined by corresponding sides of the channels in the members 11. A pair of idler sprockets 32 are mounted below the head sprockets 28 and in radial alignment therewith. The idler sprockets 32 are mounted on a shaft 33 rotatably supported by bearings 34 mounted on the brackets 15.

A carrier chain 35 is trained over each radially aligned foot sprocket 18, head sprocket 28 and idler sprocket 32 and, because of the tangential relationship between the head and foot sprockets and a plane defined by corresponding sides of the channels in the two members 11, the carrier chains will each have a run between the head and foot sprockets that lies in or parallel with this plane. The other run of each carrier chain 35 passes around an idler sprocket 32 and is thereby deflected out of underlying relationship with the sides of the head sprockets 28 opposite the guide members 11. This permits discharge from the skip hoist without interference with the carrier chains 35 as will be later described.

As illustrated in FIGS. 3 through 6, a skip bucket 36, having a discharge spout 37 at its open end, is connected to the carrier chains 35 by attachment links 38 which are spaced longitudinally of each chain with the attachment links of the two chains being arranged in laterally opposed relationship. The attachment links 38 are connected to their adjacent chain links by extended chain pins 39 which extend between the two carrier chains 35 to maintain the proper lateral spacing between the chains.

Each of the attachment links 38 is formed with flanges 41 which are apertured and laterally spaced. The bucket mounting lugs 42 at the front or open end of the bucket 36 are positioned between the mounting flanges 41 of opposed attachment links 38 and pivotally connected thereto by pins 43 which extend through the apertures in the flanges 41 and corresponding apertures formed in the lugs 42. The upper end of the bucket 36 is thus pivotally mounted upon the carrier chains 35.

Each pin 43 extends laterally outwardly from its associated attachment link 38 and has rotatably mounted thereon a wheel 44 which moves along and within the channel of the adjacent guide member 11 when the attachment link moves vertically therealong.

The rear or closed end of the bucket 36 has mounted thereon a pair of laterally spaced mounting arms 45 which are carried by a shaft 46 for pivotal movement on the bucket. The ends of the mounting arms 45 remote from the shaft 46 are positioned between the flanges 41 of opposed attachment links 38 and pivotally connected thereto by pins 47 which are similar to pins 43 and have wheels 48 rotatably mounted on laterally outwardly extending portions thereof. Wheels 48, like the wheels 44 move along and within the channel of the adjacent guide member 11 when their associated attachment link 38 moves therealong.

In operation, the bucket 36 is loaded at the foot of the guide members 11 and then hoisted upwardly in response to operation of the motor 23 to drive the foot sprockets 18 and impart movement to the carrier chains 35. During vertical movement of the bucket 36 it is guided by confinement of the wheels 44 and 48 within the channels of the guide members 11. When the attachment links 38 reach the head sprockets 28, the bucket is carried over the head sprockets to the inverted position, as seen in phantom in FIG. 1, where the contents of the bucket are released. At this time, a rotary limit switch, not shown, associated with the speed reducer 24 is actuated to stop the motor 23 and condition it for operation in a reverse direction. Subsequent actuation of the motor 23 will cause return movement of the bucket to the loading zone at which point the limit switch will again stop the motor and recondition it for movement in the original direction so that the cycle may be repeated.

By reference to FIG. 1, it will be seen that movement of the attachment links 38 onto the head sprockets 28 will cause the center-to-center distance between the wheels 44 and 48 to be reduced due to the arcuate configuration of the portions of the carrier chains 35 between the attachment links. This shortening of the center-to-center distance between wheels 44 and 48 is compensated for by pivotal movement of the arms 45 on the bucket 36.

It is to be understood that the form of the invention herein shown and described is to be taken as a preferred embodiment of the same and that various changes may be made in the shape, size and arrangement of parts without departing from the spirit of the invention or the scope of the subjoined claims.

Having thus described the invention, I claim:

1. A skip hoist comprising:
   flexible means movable in opposite directions through a path having a straight portion and an arcuate portion tangentially arranged with respect to the straight portion,
   material carrying means, and
   individual connecting means at spaced locations on said material carrying means connected respectively to spaced points on said flexible means,
   one connection means at one of said locations on said material carrying means connecting said carrying means in a fixed position longitudinally of the flexible means, and
   the other connection means at the other of said locations on said carrying means being constructed to permit relative motion of said carrying means longitudinally of the flexible means to compensate for the shortened distance between said spaced points on said flexible means in the arcuate portion of said path.

2. Apparatus as defined in claim 1 further characterized by:
   guide means mounted adjacent to and extending along the straight portion of the path of said flexible means associated to positively guide the movement of said material carrying means and the connected flexible means therealong.

3. Apparatus as defined in claim 2 further characterized by:
   said flexible means comprising a pair of endless chains spaced laterally from and in parallel relationship with each other, and
   a pair of sprockets associated with each chain for directing movement of the chain therebetween through said straight portion of its path,
   one sprocket of each pair supporting its associated chain for movement through the arcuate portion of its path.

4. Apparatus as defined in claim 3 further characterized by:
   said one sprocket of each pair being located at an elevated position relative to the other sprocket, and
   said arcuate portion of each chain path extending for a sufficient distance around said one sprocket to cause said material carrying means to be substantially completely inverted during movement through said arcuate path portion.

5. Apparatus as defined in claim 4 further characterized by:
   a pair of guide members mounted at spaced points on each chain with each guide member laterally aligned with the corresponding guide member on the other chain for cooperation with said guide means to positively guide the movement of said chains along the straight portion of their paths,
   the connection means between said one location on the material carrying means and said chains being located adjacent aligned guide members on the two chains, and
   the connection means between the other of said locations on the material carrying means and said chains being located adjacent the other aligned guide members on the two chains.

6. A skip hoist comprising:
   a pair of endless chains spaced laterally from and in parallel relationship with each other,
   a pair of sprockets associated with each chain to support the chain for movement in opposite directions through a path having a straight portion between the sprockets and a curved portion around one of said sprockets,
   said one sprocket of each pair being located at an elevated position relative to the other sprocket,
   a skip bucket pivotally connected to laterally opposed points on said chains,
   means connecting said skip bucket to laterally opposed points on said chains that are located on chain pitches which are spaced longitudinally from said points of pivotal connection,
   said connecting means being constructed to permit relative movement between said bucket and chains longitudinally of the latter, and
   means for driving said chains alternately in opposite directions to move said bucket upwardly along said straight portion of the chain paths and around said curved portion of the chain paths to invert the bucket and to move the bucket back along said curved portion and downwardly along the straight portion to its original position.

7. Apparatus as defined in claim 6 further characterized by:
   a pair of guide rails mounted adjacent to and extending longitudinally along the straight chain path portions, and wheels mounted on said chains adjacent said points of pivotal connection of the skip bucket and the longitudinally spaced points that are connected to said connecting means, said wheels cooperating with said guide rails to guide the movement of said chains and the connected bucket through the straight chain path portions.

8. Apparatus as defined in claim 6 further characterized by:

said connecting means comprising a pair of arms pivotally connected to said skip bucket and extending therefrom to said chains, and means pivotally connecting said arms to said longitudinally spaced points on said chains, pivotal movement of said arms permitting relative longitudinal between said bucket and the points of connection between said connecting means and chains when the distance between the points of connection of the chain to the bucket and connecting means is reduced by movement into the curved portion of the chain path.

References Cited

UNITED STATES PATENTS

| | | | |
|---|---|---|---|
| 975,721 | 11/1910 | Russell | 198—137 |
| 1,953,388 | 4/1934 | Bettin | 198—140 X |
| 2,013,215 | 9/1935 | Langenberg | 198—140 X |
| 2,631,459 | 3/1953 | Transeau | 198—140 X |
| 2,788,135 | 4/1957 | Girotti | 214—707 X |
| 2,893,538 | 7/1959 | Buttironi et al. | 198—110 |

EDWARD A. SROKA, *Primary Examiner.*

EVON C. BLUNK, *Examiner.*

A. C. HODGSON, *Assistant Examiner.*